No. 740,465. Patented October 6, 1903.

UNITED STATES PATENT OFFICE.

ALCIDE FRANCOIS POIRRIER, OF PARIS, FRANCE, ASSIGNOR TO STÉ. AME DES MATIÈRES COLORANTES ET PRODUITS CHIMIQUES DE ST. DENIS, OF PARIS, FRANCE.

SUBSTANTIVE BLACK DYE AND PROCESS OF MAKING SAME.

SPECIFICATION forming part of Letters Patent No. 740,465, dated October 6, 1903.

Application filed February 5, 1901. Serial No. 46,130. (Specimens.)

*To all whom it may concern:*

Be it known that I, ALCIDE FRANCOIS POIRRIER, a resident of No. 105 Rue Lafayette, Paris, France, have invented a new and useful Improvement in Substantive Black Coloring-Matters, which invention is fully set forth in the following specification.

In my Patent No. 646,873 I have described and claimed a new process of preparing sulfurized dyes dyeing cotton directly, which process consists in reacting upon aromatic polyamido or amidohydroxylated bodies (particularly paraphenylenediamin, paramidophenol, and paraorthodiamido-paraoxy-diphenylamin) with the products of the reaction of sulfur chlorid on anilin and its salts upon phenol or upon the cresols, (commercial cresol.) Later in French Patent No. 292,400, dated January 18, 1900, I have claimed the process which consists in using the same substances—that is to say, on the one hand, the chlorid of sulfur derivatives and, on the other, the substituted aromatic derivatives mentioned in Patent No. 646,873, but with the addition to them of a more or less complex aromatic nitro derivative. Since that time in pursuing my researches in the same line I have found that in place of associating the products of the sulfur-chlorid reaction with the paraorthodiamido-paraoxy-diphenylamin of Patent No. 646,873 they can be associated with paraorthoamidonitro-paraoxy-diphenylamin, with paramido-paraoxy-diphenylamin, with paramidoöxy-phenyltolylamin, with diparadioxy-diphenylamin, and lastly with diparadioxy-phenyltolylamin. The application of the process of Patent No. 646,873 to these substances leads to the obtainment of sulfurized coloring-matters which are very soluble in water and present great interest for the dyeing of unmordanted cotton.

The first matters of the diphenylamin kind under consideration are obtained some by careful reduction of the corresponding dinitro diphenylamin, as paraorthoamidonitro-paraoxy-diphenylamin, which has the corresponding paraorthodinitro body for its source, others by the known processes, elimination of ammonia from between an amido molecule and a second molecule of an amin chlorhydrate, or elimination of water from between a molecule of an amin and a molecule of phenol or naphthol, whereby in both cases is effected the union of the nuclei by —NH, or, further, by careful reduction of dyes of the class of the "indophenols" themselves obtained, as is known, by the oxidation of equimolecular mixtures of a para di-substitution aromatic derivative and a mono-substitution aromatic derivative containing such groups as OH and $NH_2$.

The following examples indicate how to conduct the operation in order to obtain the new dyes.

Example I—Paraorthoamidonitro-paraoxy-diphenylamin: One hundred parts of phenol receive by small fractions two hundred parts of sulfur chlorid. When the disengagement of HCl is ended, heat for one hour at 150° to 165° centigrade, add one hundred and thirty parts of paraorthoamidonitro-paraoxy-diphenylamin. The homogeneous mixture obtained after some moments of agitation is brought to the temperature of about 170° to 190° centigrade, which is maintained for two to three hours, stirring constantly. Then are added four hundred parts of sodium sulfid, fused in its water of crystallization, and next the whole is heated on an oil-bath at 200° centigrade, stirring the mass as long a time as possible and maintaining its proper temperature at about 180° centigrade for five hours. At the end of this time there is obtained a product which is dry and brittle, very soluble in boiling water, with a blueblack coloration, and dyeing unmordanted cotton beautiful bluish-black shades, which subsequent oxidation changes but very little. In this example the product derived from sulfur chlorid and phenol can be replaced with the corresponding product obtained from commercial cresol. There is obtained in this case a dye whose character and properties are very close to those of the preceding.

Example II—Diparadioxy-diphenylamin: One hundred parts of phenol are treated, as in Example I, with two hundred parts of sulfur chlorid. Then after heating for one hour at 150° centigrade there are added one hundred parts of diparadioxy-diphenylamin, and heating, with stirring, at 170° centigrade is continued for about three hours. The product thus obtained, insoluble in water and acids, but soluble in alkaline sulfids, has added to it one hundred and fifty parts of fused sodium sulfid, and the homogeneous mass obtained by agitation is heated to about 180° to 190° centigrade for five hours. There is obtained a brittle black mass soluble in boiling water and dyeing unmordanted cotton a greenish black, which oxidation renders a little more intense and blacker. In this example the product derived from phenol and sulfur chlorid can be replaced with the corresponding product from cresol and sulfur chlorid. A dye is obtained very close to the preceding. Likewise in this example paradioxyphenylamin can be replaced with, first, paradioxyphenyltolylamin; second, paramidooxydiphenylamin; third, paramidooxyphenyltolylamin. In case the diphenylamin employed has an indophenol for its source the above-described mode of operating will be modified. This different mode of operating is that indicated in Example III.

Example III: One hundred and fifty parts of the indophenol, which results, for instance, from the oxidation of an equimolecular mixture of paraphenylenediamin and orthocresol, are introduced into three hundred parts of sodium sulfid dissolved in cold water. Next after a contact of some hours the whole is heated on the water-bath to dryness, and then there is added to the product thus obtained the mass which has been prepared from the two hundred parts of sulfur chlorid and one hundred parts of phenol. Then the mixture is heated at 140° centigrade for three hours with agitation. At the end of this time three hundred parts of sodium sulfid are added and the heating renewed for three hours at 190° centigrade, which brings about the desiccation of the mass rendered homogeneous by agitation. Further, the order of intervention of the reagents can be inverted and the product of the action of the sulfur chlorid on phenol or cresol be made to react on the indophenol, the operation being continued by the addition of sodium sulfid, as has been said above. The new dye thus obtained is very soluble in water with violet-black coloration. It gives on unmordanted cotton a bluish-black shade which oxidating agents do not sensibly modify. In this example the product derived from sulfur chlorid and phenol can be replaced with the product derived from sulfur chlorid and commercial cresol, and, besides, in place of the indophenol which is derived from paraphenylenediamin and orthocresol use can be made of that which is obtained with paramidophenol and phenol or with paraphenylenediamin and phenol.

In the following claims the expression "diphenyl" is intended to include "phenyltolyl," the tolyl group being regarded as a substitute phenyl. Under the expression "diphenylamins" are included products from indophenols, as above indicated, as well as from other known or suitable sources, also as hereinabove indicated. The "herein-specified category of substituted diphenylamins" includes more particularly those hereinbefore named and their legal equivalents, and it will be observed that in those so named the ratio of amido to hydroxy substitution groups is in each instance less than two of the former to one of the latter, and may even become zero, as in dioxydiphenylamin and dioxyphenyltolylamin. The new or improved coloring-matters of the present invention contain sulfur and possess in the main the constitution which results from the reaction of the aromatic sulfur-chlorid derivative upon a substituted diphenylamin. In these respects they resemble the products of my before-mentioned patent, No. 646,873, which result from the reaction upon paraorthodiamidoparaoxydiphenylamin of phenol sulfid-chlorid derivatives; but they differ in constitution from these last-mentioned products in the smaller ratio of amido to hydroxy groups in the side chains of the benzene nuclei of the diphenylamin body. The presence of sulfur in the new or improved colors and the possession by them of the specified (new and old) characteristics of constitution can be determined by known or any suitable analytical methods.

What I claim is—

1. The process of making coloring-matters consisting in causing an aromatic sulfur-chlorid derivative as specified to react upon an aromatic derivative belonging to the herein-specified category of substituted diphenylamins, the ratio of amido to hydroxy substitution groups in these diphenylamins being less than two of the former to one of the latter, substantially as described.

2. A coloring-matter, dissolving readily in water, dyeing unmordanted cotton blue-black shades on which energetic oxidating agents, bichromate, &c., have but little action, containing sulfur, having the general constitution which results from reaction of an aromatic sulfur-chlorid derivative upon a substituted diphenylamin, and being also distinguished by having a ratio of amido to hydroxy substitution groups of less than two of the former to one of the latter, substantially as described.

In witness whereof I have hereunto signed my name in the presence of two subscribing witnesses.

ALCIDE FRANCOIS POIRRIER.

Witnesses:
EDWARD P. MACLEAN,
CHARLES MARDELES.